United States Patent
Shirai et al.

(10) Patent No.: US 8,467,020 B2
(45) Date of Patent: Jun. 18, 2013

(54) COLOR FILTER SUBSTRATE AND LIQUID CRYSTAL DISPLAY DEVICE

(75) Inventors: Tohru Shirai, Osaka (JP); Masaharu Akitomo, Osaka (JP); Junichi Morinaga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 258 days.

(21) Appl. No.: 12/920,739

(22) PCT Filed: Mar. 9, 2009

(86) PCT No.: PCT/JP2009/054451
§ 371 (c)(1),
(2), (4) Date: Sep. 2, 2010

(87) PCT Pub. No.: WO2009/122864
PCT Pub. Date: Oct. 8, 2009

(65) Prior Publication Data
US 2011/0001911 A1   Jan. 6, 2011

(30) Foreign Application Priority Data
Apr. 1, 2008  (JP) .................. 2008-095135

(51) Int. Cl.
G02F 1/1333   (2006.01)
G02F 1/1335   (2006.01)

(52) U.S. Cl.
USPC ............... 349/110; 349/106; 349/111

(58) Field of Classification Search
USPC ................ 349/38–39, 106–111
See application file for complete search history.

(56) References Cited

U.S. PATENT DOCUMENTS

| 5,870,157 | A | 2/1999 | Shimada et al. |
| 6,509,125 | B1 | 1/2003 | Ito et al. |
| 2004/0130253 | A1 | 7/2004 | Ohsaki et al. |
| 2004/0229139 | A1* | 11/2004 | Tanaka et al. ............ 430/7 |
| 2006/0028598 | A1* | 2/2006 | Lee et al. ............ 349/107 |
| 2007/0132921 | A1* | 6/2007 | Yoon ............ 349/107 |
| 2007/0206303 | A1 | 9/2007 | Sumino et al. |
| 2008/0002136 | A1* | 1/2008 | Lee ............ 349/156 |
| 2010/0208178 | A1 | 8/2010 | Hayano |

FOREIGN PATENT DOCUMENTS

| JP | 09-230124 | 9/1997 |
| JP | 2002-71935 | 3/2002 |
| JP | 2004-151459 | 5/2004 |
| JP | 2004-361933 | 12/2004 |
| JP | 2006-189511 | 7/2006 |
| JP | 2006-227295 | 8/2006 |
| JP | 2008-20517 | 1/2008 |
| WO | 2008/035482 | 3/2008 |

* cited by examiner

OTHER PUBLICATIONS

International Search Report for PCT/JP2009/054451, mailed Jun. 9, 2009.

Primary Examiner — Bumsuk Won
Assistant Examiner — Charles Chang
(74) Attorney, Agent, or Firm — Nixon & Vanderhye P.C.

(57) ABSTRACT

The present invention provides a color filter substrate and a liquid crystal display device which enable easy color design for a liquid crystal display panel, can suppress both a switching domain and disclination, and can also suppress a decrease in the aperture ratio. The color filter substrate of the present invention has a structure in which adjacent color filters have respective projections that project toward each other and are in contact with each other on a light-shielding member; a structure in which color filter regions for same-color dots adjacent to each other are partially connected on the shielding member; or a structure in which the above structures are combined.

14 Claims, 9 Drawing Sheets

COLOR FILTER SUBSTRATE AND LIQUID CRYSTAL DISPLAY DEVICE

This application is the U.S. national phase of International Application No. PCT/JP2009/054451, filed 9 Mar. 2009, which designated the U.S. and claims priority to Japanese Patent Application No. 2008-095135, filed 1 Apr. 2008, the entire contents of each of which are hereby incorporated by reference.

TECHNICAL FIELD

The present invention relates to a color filter substrate and a liquid crystal display device. More specifically, the present invention relates to a color filter substrate having a rubbed alignment film, and to a liquid crystal display device having the color filter substrate.

BACKGROUND ART

Liquid crystal display devices are widely used for electronic equipment such as monitors, projectors, cellular phones, and PDAs (Personal Digital Assistants) because of their advantages such as the slim profile, light weight, and low power consumption. Especially TFT-type liquid crystal display devices (hereinafter also referred to as "TFT-LCDs") are widely used and the market for TFT-LCDs is expected to be further expanded. This situation brings a demand for further improvement of image qualities of TFT-LCDs.

Figure 8:
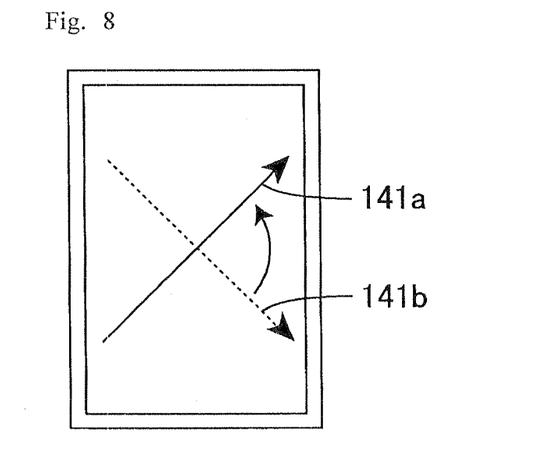
FIG. 8 is a conceptual diagram illustrating the rubbing directions of alignment films and the twisting direction of liquid crystals in a plan view of a dot in a TN liquid crystal display device.

FIG. 8 is a conceptual diagram illustrating the rubbing directions for alignment films and the twisting direction of liquid crystals, in a plan view of a dot of a TN liquid crystal display device. TFT-LCDs that have been most widely used up to now are TN LCDs in which liquid crystal molecules having positive dielectric anisotropy are horizontally aligned between a pair of substrates facing each other. Those TN LCDs have a rubbed alignment film on the liquid-crystal-side face of each of the substrates. Here, as illustrated in FIG. 8, a rubbing direction 141a for one of the substrates is designed to be perpendicular to a rubbing direction 141b for the other of the substrates. This design aligns the liquid crystal molecules adjacent to one of the substrates to be perpendicular to the liquid crystal molecules adjacent to the other of the substrates. Between the pair of substrates, liquid crystal molecules are thus twisted 90° as shown by the curved arrow in FIG. 8 when no voltage is applied between the substrates.

Figure 9:
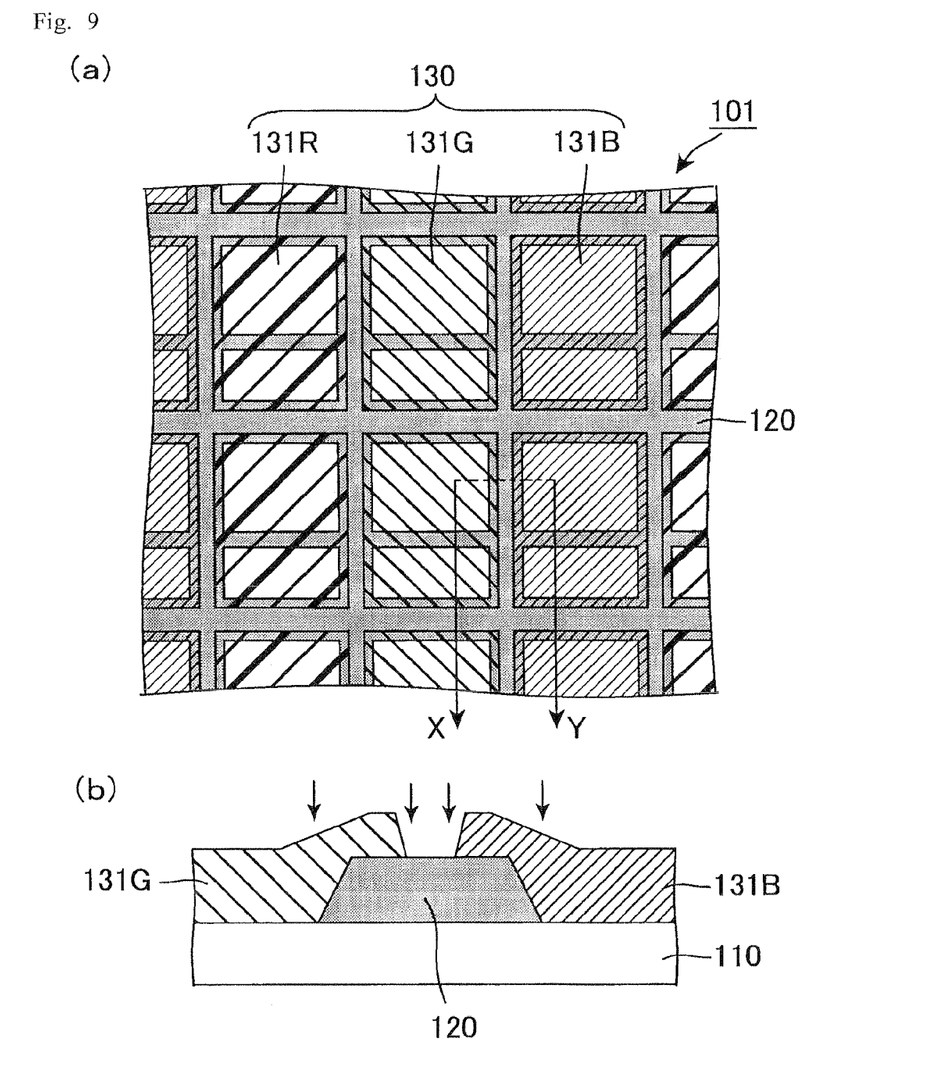
FIG. 9 are schematic views each illustrating a conventional color filter substrate.

Further, TFT-LCDs, including TN LCDs, usually have a color filter substrate as one of the pair of substrates. FIG. 9 are schematic views each illustrating a conventional color filter substrate: FIG. 9(a) shows a plan view of the substrate; and FIG. 9(b) shows a cross-sectional view taken along the X-Y line in FIG. 9(a). A conventional color filter substrate 101 has a structure in which a black matrix 120 formed of a black resin, a filter layer 130 having red (R) color filters 131R, green (G) color filters 131G, and blue (B) color filters 131B arranged planarly therein, and a counter electrode are stacked on a transparent substrate 110. The color filters 131R, the color filters 131G, and the color filters 131B are formed of respective colored resins and are arranged such that the end of each filter overlies the black matrix 120. Meanwhile, the color filters 131R, the color filters 131G, and the color filters 131B are arranged such that they do not come into contact with each other. The black matrix 120 has openings corresponding to dots (sub pixels), and one of the color filter 131R, the color filter 131G, and the color filter 131B is arranged in each opening.

The counter electrode covers the black matrix 120 and the filter layer 130. When cracked, the counter electrode can have an increased electrical resistance value. In view of prevention of an increase in the resistance value, Patent Document 1, for example, discloses a color filter that has filter layers arranged planarly with a space between each other on a substrate, and has in each filter layer an overlapping portion that partially overlaps one side of an adjacent filter layer.

[Patent Document 1]
Japanese Kokai Publication No. 2002-71935 (JP-A-2002-71935)

DISCLOSURE OF THE INVENTION

Figure 10:
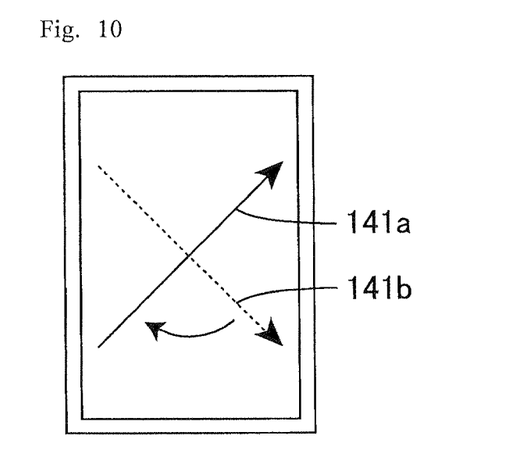
FIG. 10 is a conceptual diagram illustrating the rubbing directions of alignment films and the twisting direction of liquid crystals in a plan view of a dot having disclination caused therein in a TN liquid crystal display device.

When the conventional color filter substrate 101 is used for a liquid crystal display device in a mode that employs rubbed alignment films, such as TN mode, disclination sometimes occurs in the dots and thus a defective LCD can be produced. Now, a disclination phenomenon is explained in more detail with reference to FIG. 10. FIG. 10 is a conceptual diagram illustrating the rubbing directions of alignment film and the twisting direction of liquid crystals in a plan view of a dot of a TN liquid crystal display device. Here, disclination has occurred in the dot. As illustrated in FIG. 10, the dot with disclination (disclination dot) has been rubbed in the same directions (the rubbing direction 141a and the rubbing direction 141b which are perpendicular to each other) as those for normal dots illustrated in FIG. 8. However, the liquid crystal molecules in the disclination dot are twisted in the reverse direction (indicated by the curved arrow in FIG. 10) (reverse tilt) of the twisting direction (indicated by the curved arrow in FIG. 8) of the liquid crystal molecules in the normal dot. Disclination dots therefore show different polarization characteristics of light, transmitting through the liquid crystal layer, from those of normal dots. Due to this difference, a disclination dot looks like a tiny bright point, for example in the black display in the TN mode. Further, disclination in a part of dots tends to cause disclination in the surrounding normal dots. Disclination is more likely to occur in finer dots.

Meanwhile, when the overlapping portion is arranged in a dot opening, the technique described in Patent Document 1 produces a steep elevation change in the overlapping portion lying in the opening, and thus tends to form a "switching domain". Further, color design for such a liquid crystal display panel is difficult because the chromaticity changes at the overlapping portion. Note that a switching domain means a phenomenon in which light leakage in display occurs because of liquid crystal molecules the alignment of which is not controlled. When the overlapping portion is arranged in the light-shielding portion, the aperture ratio falls.

The present invention has been made in view of the above-mentioned state of the art. The present invention aims to provide a color filter substrate and a liquid crystal display device which enable easy color design for a liquid crystal display panel, can suppress occurrence of both a switching domain and disclination, and can also suppress a decrease in the aperture ratio.

The present inventors have made various studies on a color filter substrate and a liquid crystal display device which enable easy color design for a liquid crystal display panel, can suppress occurrence of both a switching domain and disclination, and can also suppress a decrease in the aperture ratio. In the studies, the present inventors have focused on the elevation change in the color filter substrate. As a result, the inventors have found the cause of disclination. Specifically, the black matrix 120, the color filters 131R, the color filters 131G, and the color filters 131B are usually formed of respective resins for the conventional color filter substrate 101, and the thicknesses thereof are therefore comparatively large, which are such on the order of micrometers. Also, the end of each of the color filter 131R, the color filter 131G, and the color filter 131B is arranged on the black matrix 120, and thus at least four steep elevation changes occur between adjacent dots as illustrated in FIG. 9(*b*) (the elevation changes are indicated by arrows in FIG. 9(*b*): specifically, two elevation changes resulting from the existence of the black matrix 120 occur in the color filter 131R, the color filter 131G, and the color filter 131B; and two elevation changes occur at the end faces of the color filter 131R, the color filter 131G, and the color filter 131B). These elevation changes have been found to be the cause of disclination in a liquid crystal display device provided with the conventional color filter substrate 101. The reason for this is that disclination easily occurs if the liquid crystal molecule alignment is discontinuous at many points, and that the liquid crystal molecule alignment is often discontinuous at a portion with an elevation change if the elevation change is steep. In addition, alignment control by rubbing of alignment films may become difficult near a portion with a steep elevation change. The inventors have also found that a fine dot tends to have disclination at a high probability because the distance is shorter between the center of a fine dot and the portion with the color filters 131R, 131G, and 131B and the black matrix 120 stacked therein.

As a result of further studies, the following structures have been found to be able to suppress a decrease in the aperture ratio, make the color design for a liquid crystal display panel easy, and reduce the number of steep elevation changes occurring in a color filter substrate while partially connecting adjacent dots and making it easier to maintain the continuity of the alignment. In one structure, adjacent color filters have respective projections that project toward each other and are in contact with each other on a light-shielding member. In another structure, color filter regions for same-color dots adjacent to each other are partially connected on the shielding member. In yet another structure, the above two structures are combined. These structures have solved the above-mentioned problems admirably, leading to completion of the present invention.

That is, the present invention provides a color filter substrate including, on a substrate: a plurality of dots; a light-shielding member that shields a portion between the plurality of dots from light; and a plurality of color filters that are arranged planarly and overlap at respective ends thereof the light-shielding member, wherein the plurality of color filters include a first color filter and a second color filter adjacent to each other, the first color filter and the second color filter respectively have a first projection and a second projection which project toward each other, and the first projection and the second projection are in contact with each other on the light-shielding member.

This allows reduction of the number of steep elevation changes occurring in a region in which the first projection and the second projection are in contact with each other. It is therefore possible to reduce the number of steep elevation changes occurring between adjacent dots, compared to the conventional color filter substrates. Accordingly, the continuity of liquid crystal molecule alignment is easily maintained in a region in which the first projection and the second projection are in contact with each other, i.e., in a region in which ends of color filters in dots adjacent to each other are in contact with each other. As a result, disclination can be suppressed and thus yield of products can be improved.

When the size (proportion) of a region is excessively enlarged in which adjacent color filters are in contact with each other at the ends thereof, a defect called a switching domain is noticeable. The color filter substrate of the present invention can suppress occurrence of both a switching domain and disclination because the first color filter and the second color filter are in contact with each other at the first projection and the second projection which project toward each other.

Further, the first projection and the second projection are in contact with each other on the light-shielding member. This allows effective suppression of adverse effect on displayed colors of the liquid crystal display panel even when the first color filter and the second color filter are of different colors and the chromaticity changes at the first projection and the second projection. That is, color design for a liquid crystal display panel can be made easily regardless of the layout of the first projection and the second projection and a chromaticity change that can occur at the projections.

Furthermore, since both the first color filter and the second color filter project toward each other on the light-shielding member, the color filter substrate of the present invention can achieve high aperture ratio compared to a substrate having a structure in which one of adjacent color filters projects toward the other.

The present invention also provides a color filter substrate including, on a substrate: a plurality of dots; a light-shielding member that shields a portion between the plurality of dots from light; and a plurality of color filters that are arranged planarly and overlap at respective ends thereof the light-shielding member, wherein the plurality of color filters include a third color filter that includes a plurality of dot portions for same-color dots adjacent to each other, and a connecting portion disposed on the light-shielding member, and adjacent dot portions among the plurality of dot portions of the third color filter are partially connected at the connecting portion.

Such a color filter substrate can reduce the number of steep elevation changes occurring at the connecting portion. It is therefore possible to reduce the number of steep elevation changes occurring between adjacent dots, compared to the conventional color filter substrates. Accordingly, the continuity of liquid crystal molecule alignment is easily maintained at the connecting portion, i.e., in a region in which dot portions for same-color dots (dots of the same color) adjacent to each other are partially connected. As a result, occurrence of disclination can be suppressed and thus yield of products can be improved.

When the size of a region is excessively enlarged in which color filters are partially connected, a defect called a switching domain is noticeable. The color filter substrate of the present invention can suppress occurrence of both a switching domain and disclination because dot portions for same-color dots adjacent to each other are partially connected.

Further, the chromaticity does not change even when the dot portions for same-color dots adjacent to each other are connected, and therefore adverse effect is not caused on displayed colors of the liquid crystal display panel. That is, color design for a liquid crystal display panel can be made easily regardless of the layout of the connecting portion.

Furthermore, partially connecting, on the light-shielding member, dot portions for same-color dots adjacent to each other does not decrease the aperture ratio. That is, a decrease in the aperture ratio can be effectively suppressed.

The configuration of the color filter substrate of the present invention is not particularly limited as long as the substrate includes the above elements, and may or may not include other elements. Preferable embodiments of the color filter substrate according to the present invention are described in detail below. Note that the various structures below may be appropriately combined.

The first color filter and the second color filter are preferably of different colors. This more effectively suppresses a chromaticity change in a liquid crystal display panel caused by a chromaticity change in the first projection and the second projection while effectively suppressing a decrease in the aperture ratio.

The color filter substrate of the present invention may have either of the following structures: (A) the first projection and the second projection do not overlap but are in contact with each other; and (B) the first projection and the second projection have respective overlapping portions which overlap each other. In order to further reduce the number of steep elevation changes between adjacent dots and further suppress disclination, the structure (A) is preferable. Meanwhile, in order to facilitate production of the color filter substrate of the present invention, the structure (B) is preferable.

A ratio We/Wb of a width We of the connecting portion and an aperture width (width of dot openings) Wb of the dot is preferably 0.3 or more. A value of We/Wb of less than 0.3 may not lead to sufficient effect of suppressing disclination.

A conventional color filter substrate having any of the following structures especially tends to cause disclination. Thus, the effect of suppressing disclination is remarkable when the following structures are applied to the color filter substrate of the present invention. That is, in a structure, each of the dots may be surrounded by the light-shielding member. In another structure, the plurality of color filters each may have an elevation change resulting from the light-shielding member. In another structure, the light-shielding member may contain a resin. In yet another structure, the color filter substrate may not include any overcoat layer for covering the light-shielding member and the plurality of color filters.

The plurality of color filters each are preferably formed of a liquid resist or a film resist. This structure usually leads to unevenness between adjacent dots. Thus, the effect of suppressing disclination is remarkable when the concept of the present invention is applied to this embodiment. The color filters can be suitably formed by a certain method such as a method using a coater and a method using a dry film, which are now mainly employed as a method of forming a color filter.

From the same point of view, each of the plurality of color filters preferably has a smaller thickness on the light-shielding member than in a dot opening.

The plurality of color filters each preferably have a cross section of a forward tapered shape. This enables uniform application of an alignment film and/or a transparent conductive film (counter electrode) on the color filter substrate in a seamless manner.

The present invention also provides a liquid crystal display device including the color filter substrate of the present invention, a substrate facing the color filter substrate, and a liquid crystal layer sandwiched between the substrates. Such a liquid crystal display device enables suppression of defects attributed to disclination dots, and thus improves yield of products. Also, the color design for a liquid crystal display panel can be made easily, and a high aperture ratio can be maintained.

The configuration of the liquid crystal display device of the present invention is not particularly limited as long as the display device includes the above elements. The configuration may or may not include other elements.

Preferable embodiments of the liquid crystal display device according to the present invention are described in detail below. The various embodiments below may be appropriately combined.

The mode of the liquid crystal display device is not particularly limited. Preferable one is a mode with rubbed alignment films. That is, the color filter substrate preferably has a rubbed alignment film on a surface on the liquid crystal layer side. This is because disclination occurs in a mode with rubbed alignment films. Examples of the mode with rubbed alignment films include the TN (Twisted Nematic) mode, the IPS (In-Place Switching) mode, the VA (Vertical Alignment) mode, and the MVA (Multi-domain Vertical Alignment) mode. In order to more effectively provide the effect of the present invention, the TN mode is particularly preferable.

A conventional liquid crystal display device represented by either of the following structures especially tends to cause a disclination. Thus, the effect of suppressing disclination is remarkable when the following structures are applied to the liquid crystal display device of the present invention. That is, in a structure, the alignment film has an elevation change resulting from the plurality of color filters. In another structure, the color filter substrate has a columnar spacer on the liquid crystal layer side.

Effect of the Invention

The color filter substrate and the liquid crystal display device of the present invention enable easy color design for a liquid crystal display panel, can suppress occurrence of both a switching domain and disclination, and can also suppress a decrease in the aperture ratio.

BEST MODES FOR CARRYING OUT THE INVENTION

The present invention is described in more detail based on the following embodiments with reference to the drawings. The present invention is not limited to these embodiments.

Embodiment 1

The liquid crystal display device of the present embodiment is a TN liquid crystal display device provided with a TFT substrate and a color filter substrate which face each other. The liquid crystal display device has spacers to maintain a certain space between the substrates. The TFT substrate and the color filter substrate are attached via a sealing agent. A liquid crystal material containing liquid crystal molecules (nematic liquid crystals) having positive dielectric anisotropy is filled between the substrates such that a liquid crystal layer is formed. The liquid crystal layer is in a horizontal alignment mode in which liquid crystal molecules are aligned substantially in parallel with the substrates when no voltage is applied between the substrates. Here, the TFT substrate has a common structure. For example, the TFT substrate has, on a transparent substrate, wirings such as source lines, gate lines, and Cs lines (storage capacitor wirings); TFTs which are switching elements; an insulating layer; pixel electrodes formed of a transparent conductive film; and a rubbed alignment film.

Figure 1:
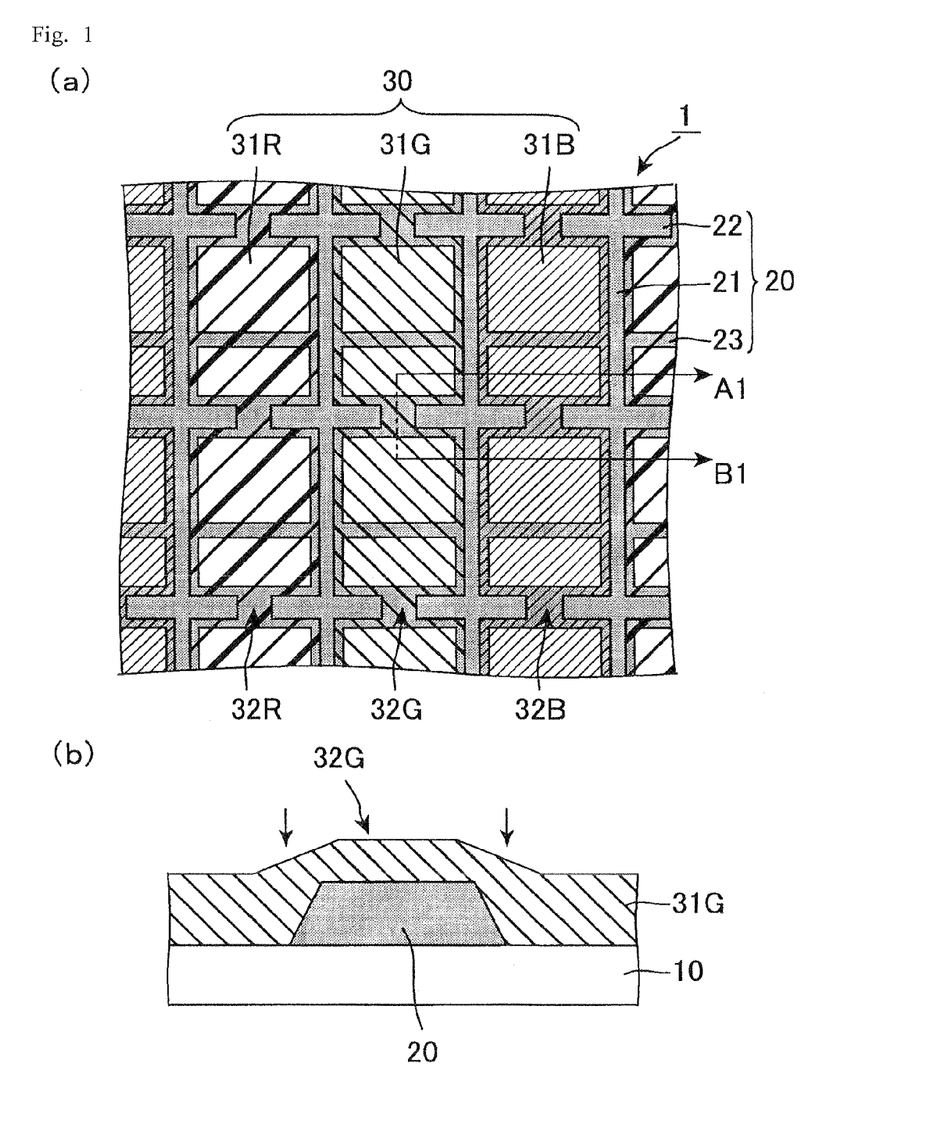
FIG. 1 are schematic views each illustrating the color filter substrate of Embodiment 1 according to the present invention.

FIG. 1 are schematic views each illustrating a color filter substrate of Embodiment 1 according to the present invention: FIG. 1(a) shows a plan view of the substrate; and FIG. 1(b) shows a cross-sectional view taken along the A1-B1 line in FIG. 1(a). The color filter substrate 1 of the present embodiment has a structure in which the following components are stacked on one main face (on the liquid crystal layer side) of a transparent substrate 10, in the order of: a black matrix 20 serving as a light-shielding member to shield from light a portion between adjacent dots; a filter layer 30 having red (R) color filters 31R, green (G) color filters 31G, and blue (B) color filters 31B are arranged therein in a manner that a filter is provided for a dot; a counter electrode (not illustrated) formed of a transparent conductive film; and a rubbed alignment film (not illustrated)

The black matrix 20 has portions (source light-shielding portions) 21 which are formed along the source lines of the TFT substrate (counter substrate) and extend in the vertical direction in FIG. 1; thick portions (gate light-shielding portions) 22 which are formed along the gate lines of the TFT substrate and extend in the horizontal direction in FIG. 1; and thin portions (Cs light-shielding portions) 23 which are formed along the Cs lines of the TFT substrate and extend in the horizontal direction in FIG. 1. The gate light-shielding portions 22 and the Cs light-shielding portions 23 are arranged parallel to each other, and the source light-shielding portions 21 perpendicularly intersect the gate light-shielding portions 22 and the Cs light-shielding portions 23. Each opening region surrounded by the source light-shielding portions 21 and the gate light-shielding portions 22 is generally one dot (a single-color region constituting a pixel, i.e., a sub pixel). In this way, each dot is surrounded by the source light-shielding portions 21 and the gate light-shielding portions 22 of the black matrix 20. The color filter substrate 1 employs a stripe arrangement in which the dots of R, G, and B are arranged in stripes. The three dots of R, G, and B, which are adjacent to each other in the horizontal direction in FIG. 1, constitute one pixel (the smallest unit of a display image) in the liquid crystal display device of the present embodiment. The TFT substrate has for each dot a TFT as a switching element, and a pixel electrode connected to the TFT.

The color filters 31R, the color filters 31G, and the color filters 31B are basically arranged such that a color filter corresponds to the opening of a dot (dot opening), and color filters arranged adjacent to each other in the vertical and horizontal directions in FIG. 1 have a space therebetween. Each of the color filter 31R, the color filter 31G, and the color filter 31B has regions (dot portions) constituting respective dots which are of the same color (same-color dots) in the vertical direction in FIG. 1, and those dot portions are partially connected to each other on the black matrix 20. Specifically, the color filters 31R, the color filters 31G, and the color filters 31B respectively have connecting portions 32R, connecting portions 32G, and connecting portions 32B, and each connecting portion has a substantially rectangular shape in a plan view and partially connects dot portions for adjacent same-color dots at apart of the border of same-color dots. That is, each color filter in a plan view has a shape with narrow portions at the connecting portions 32R, the connecting portions 32G, and the connecting portions 32B.

This configuration reduces the number of steep elevation changes occurring in the vicinity of the black matrix 20 between same-color dots, compared to the conventional color filter substrate. More specifically, locations of steep elevation changes resulting from the black matrix 20 can be reduced to two (the two locations shown by arrows in FIG. 1(*b*)) at each of the connecting portions 32R, the connecting portions 32G, and the connecting portions 32B. Accordingly, the continuity of liquid crystal molecule alignment between adjacent same-color dots can be maintained easily. As a result, disclination can be suppressed in the liquid crystal display device of the present embodiment which employs rubbed alignment layers.

Further, each of the color filter 31R, the color filter 31G, and the color filter 31B in the color filter substrate 1 has dot portions thereof connected only at a part, more specifically the center, of the border of adjacent same-color dots, not at the entire border. This configuration reduces a switching domain (prevents a switching domain from being dominant) attributed to the connecting portions 32R, the connecting portions 32G, and the connecting portions 32B, and also suppresses disclination. The width of each of the connecting portion 32R, the connecting portion 32G, and the connecting portion 32B may be appropriately set in light of the configuration, such as the layout, of the dots. The width is preferably not less than 10 μm, and is most preferably 15 μm.

Further, when each of the color filter 31R, the color filter 31G, and the color filter 31B has its dot portions for same-color dots connected as illustrated in FIG. 1, the number of steep elevation changes can be more surely reduced, compared to later-described embodiments in which adjacent color filters of different colors overlap, or do not overlap but are in contact with each other. Accordingly, the present embodiment enables easier maintenance of the continuity of liquid crystal molecule alignment between adjacent dots.

In the present embodiment, all the dot portions for same-color dots are partially connected to each other in the entire display region. Accordingly, it is possible to reduce a switching domain and suppress occurrence of disclination in the entire display region of the liquid crystal display device.

FIG. 1 illustrate the embodiment in which the connecting portion 32R, the connecting portion 32G, and the connecting portion 32B are respectively arranged at the centers of the borders in the color filters 31R, the color filters 31G, and the color filters 31B (or of the borders of dots). The arrangement places of the connecting portion 32R, the connecting portion 32G, and the connecting portion 32B, i.e., the respective positions of the connecting portion 32R, the connecting portion 32G, and the connecting portion 32B at the borders of the color filters 31R, the color filters 31G, and the color filters 31B may be appropriately set. The connecting portion 32R, the connecting portion 32G, and the connecting portion 32B may be arranged in the corners of the borders of dots or at places near the corners.

The connecting portion 32R, the connecting portion 32G, and the connecting portion 32B each may have any shape in a plan view, and may have a substantially rectangular shape as illustrated in FIG. 1(*a*), or may have any other shape such as a substantially trapezoid shape and a substantially polygonal shape.

Figure 2:
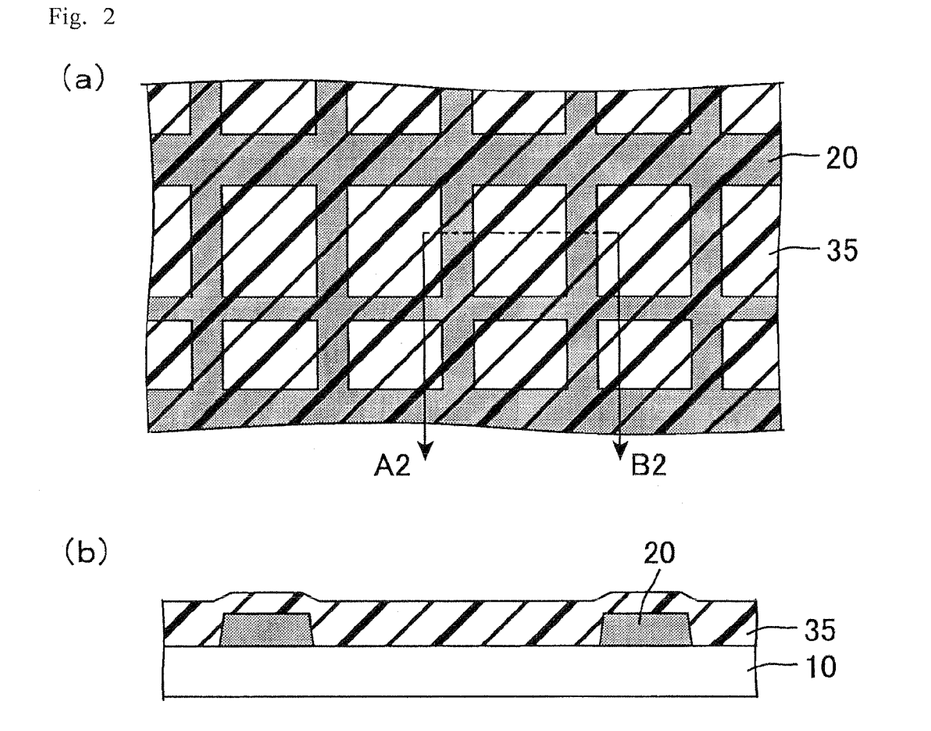
FIG. 2 are schematic views each illustrating the color filter substrate of Embodiment 1 according to the present invention in a production process.

Next, the method of producing the liquid crystal display device of the present embodiment is described. Since the processes other than the process of producing the color filter substrate 1, such as a process of producing a TFT substrate and a process of panel assembling, are the same as conventional processes, the method of producing the color filter substrate 1 is mainly described here. FIG. 2 are schematic views each illustrating the color filter substrate of Embodiment 1 according to the present invention in a production process; FIG. 2(*a*) shows a plan view of the substrate; and FIG. 2(*b*) shows the cross-sectional view taken along the A2-B2 line in FIG. 2 (*a*).

The color filter substrate 1 is formed by photolithography. More specifically, first, a common positive or negative black photosensitive resin composition (for example, a positive or negative photosensitive acrylic resin composition containing carbon black or a pigment) is applied on the transparent substrate 10 so that a black photosensitive resin film is formed. Then, the black photosensitive resin film is patterned by photolithography into the black matrix 20 having a thickness of from 0.8 to 1.5 µm (for example, 1.2 µm). The black matrix 20 may have a cross section of a forward tapered shape, a reverse tapered shape, or a non-tapered shape (a shape with the end faces forming a substantially right angle with the transparent substrate 10). Here, the forward tapered shape refers to a quadrilateral shape that the edge on the top (air-side) has a length shorter than the edge at the bottom (substrate side) in the cross-sectional view. The reverse tapered shape refers to a quadrilateral shape that the edge on the top has a length longer than the edge at the bottom in the cross-sectional view.

The black matrix 20 may be formed in any layout as long as it is formed to shield at least apart of each portion between adjacent dots from light. The black matrix 20 may have only the source light-shielding portions 21 and the gate light-shielding portions 22 or may further have portions that shield the switching elements of the TFT substrate from light. Alternatively, the black matrix 20 may have only the source light-shielding portions 21 as described later in FIG. 5.

A substrate suitable for the transparent substrate 10 is a glass substrate in many cases, but may be produced from a plastic film, a plastic sheet, or the like. Here, according to need, a thin film being able to improve adhesion may be provided in advance on the transparent substrate 10 in order to improve the adhesion of the transparent substrate 10 to the black matrix 20 and the filter layer 30.

Next, a positive or negative liquid color resist (such as a positive or negative photosensitive acrylic resin composition containing a pigment), or a positive or negative film color resist (such as a positive or negative photosensitive acrylic film containing a pigment) is applied or transferred on the transparent substrate 10 so that a red photosensitive resin film (color film) 35 is formed. At this time, as illustrated in FIG. 2, the red photosensitive resin film 35 flattens, to some extent, the black matrix 20 on the transparent substrate 10. Thereafter, the red photosensitive resin film is patterned by photolithography into color filters 31R which have the connecting portions 32R, have a cross section of a forward tapered shape, and have a thickness in the dot opening (a region where no black matrix 20 is formed) of preferably from 1 to 2 µm (for example, 1.5 µm). The color filters 31R overlap at the ends thereof the black matrix 20, and therefore have elevation changes resulting from the black matrix 20. The color filters 31R have a smaller thickness on the black matrix 20 than in the dot opening. More specifically, the color filters 31R usually have a thickness of about from 0.1 to 1.8 µm on the black matrix 20, although the thickness may vary depending on the width of the color film on the black matrix 20 and the thickness of the color film in the dot opening. Meanwhile, the difference between the heights of the color filters 31R in the dot opening and the heights of the color filters 31R on the black matrix 20 is usually about from 0.1 to 1.5 µm.

Next, a positive or negative liquid color resist (such as a positive or negative photosensitive acrylic resin composition containing a pigment), or a positive or negative film color resist (such as a positive or negative photosensitive acrylic film containing a pigment) is applied or transferred on the transparent substrate 10 so that a green photosensitive resin film (color film) is formed. At this time, the green photosensitive resin film flattens, to some extent, the black matrix 20 on the transparent substrate 10. Thereafter, the green photosensitive resin film is patterned by photolithography into color filters 31G which have the connecting portions 32G, have a cross section of a forward tapered shape, and have a thickness in the dot opening (a region where no black matrix 20 is formed) of preferably from 1 to 2 µm (for example, 1.5 µm). The color filters 31G overlap at the ends thereof the black matrix 20, and therefore have elevation changes resulting from the black matrix 20. The color filters 31G have a smaller thickness on the black matrix 20 than in the dot opening. More specifically, the color filters 31G usually have a thickness of about from 0.1 to 1.8 µm on the black matrix 20, although the thickness may vary depending on the width of the color film on the black matrix 20 and the thickness of the color film in the dot opening. Meanwhile, the difference between the heights of the color filters 31G in the dot opening and the heights of the color filters 31G on the black matrix 20 is usually about from 0.1 to 1.5 µm.

Next, a positive or negative liquid color resist (such as a positive or negative photosensitive acrylic resin composition containing a pigment), or a positive or negative film color resist (such as a positive or negative photosensitive acrylic film containing a pigment) is applied or transferred on the transparent substrate 10 so that a blue photosensitive resin film (color film) is formed. At this time, the blue photosensitive resin film flattens, to some extent, the black matrix 20 on the transparent substrate 10. Thereafter, the blue photosensitive resin film is patterned by photolithography into color filters 31B which have the connecting portions 32B, have a cross section of a forward tapered shape, and have a thickness in the dot opening (a region where no black matrix 20 is formed) of preferably from 1 to 2 µm (for example, 1.5 µm). The color filters 31B overlap at the ends thereof the black matrix 20, and therefore have elevation changes resulting from the black matrix 20. The color filters 31B have a smaller thickness on the black matrix 20 than in the dot opening. More specifically, the color filters 31B usually have a thickness of about from 0.1 to 1.8 µm on the black matrix 20, although the thickness may vary depending on the width of the color film on the black matrix 20 and the thickness of the color film in the dot opening. Meanwhile, the difference between the heights of the color filters 31B in the dot opening and the heights of the color filters 31B on the black matrix 20 is usually about from 0.1 to 1.5 µm.

As described above, formation of the color filters 31R, the color filters 31G, and the color filters 31B with use of a liquid resist or a film resist leads to unevenness between adjacent dots. Thus, the effect of suppressing disclination is remarkable when the concept of the present invention is applied to a color filter substrate produced by such a formation method.

Further, when the color filters 31R, the color filters 31G, and the color filters 31B are designed to have a cross section (particularly at the end thereof) of a forward tapered shape, an alignment film and a transparent conductive film (common electrode) can be uniformly applied on the transparent substrate 10 in a seamless manner.

Since the color filters 31R, the color filters 31G, and the color filters 31B can be formed only by leaving the regions, which are usually removed by etching, as the connecting portions 32R, the connecting portions 32G, and the connecting portions 32B, the black matrix 20 does not need to have a thickness larger than the thickness conventionally required. That is, a decrease in the aperture ratio can be effectively suppressed in production of the color filter substrate 1.

The order of forming the color filters 31R, the color filters 31G, and the color filters 31B can be appropriately set (changed).

In the case that a photo spacer (columnar spacer) is to be provided as the spacer, a positive or negative photosensitive resin composition (such as a positive or negative photosensitive acrylic resin composition) is applied on the formed color filters so that a transparent photosensitive resin film is formed. The transparent photosensitive resin film is then patterned by photolithography, whereby a columnar photo spacer is formed above the black matrix 20.

Figure 11:
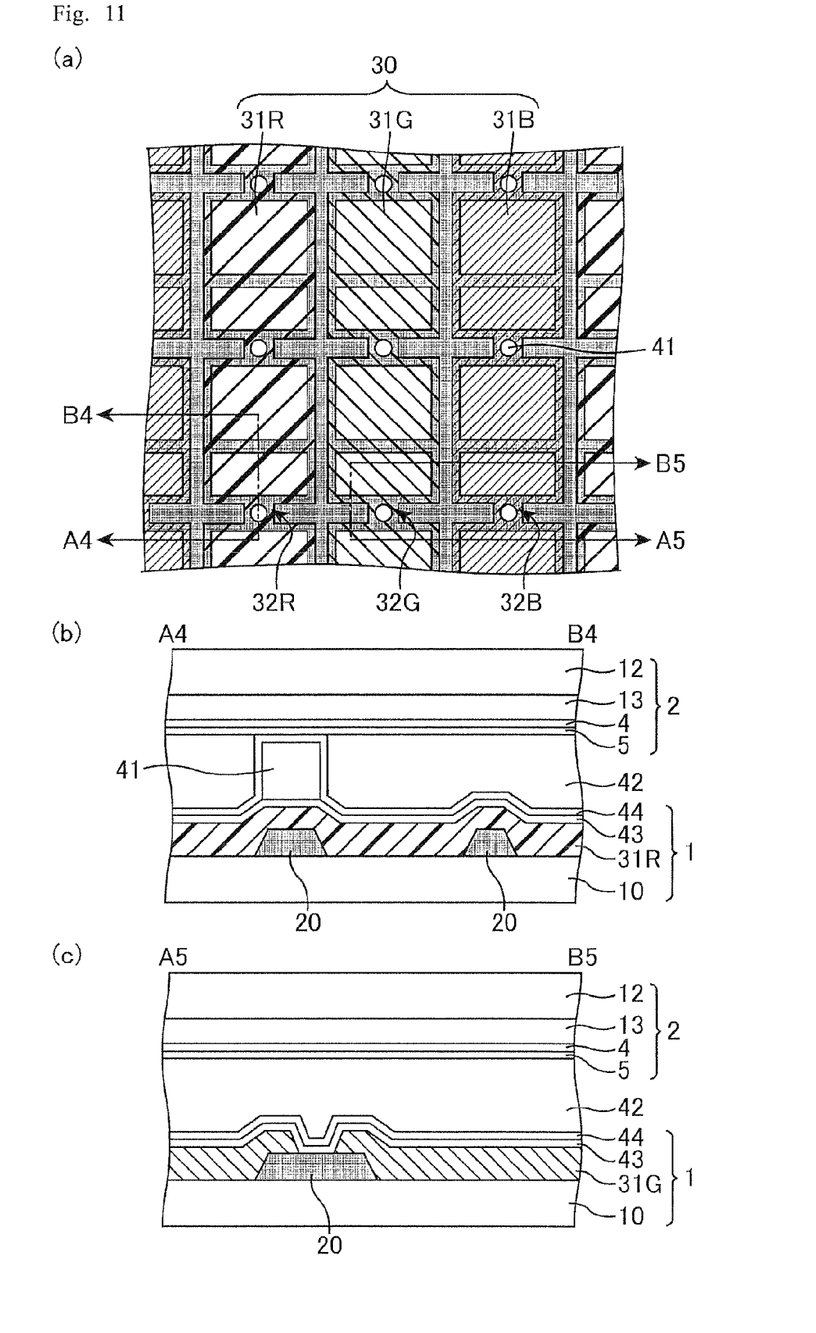
FIG. 11 are schematic views each illustrating the liquid crystal display device of Embodiment 1 according to the present invention.

Here, the liquid crystal display of the present embodiment in the case of having a photo spacer as the spacer is described in more detail with reference to FIG. 11. In this case, the liquid crystal display device of the present embodiment has a TFT substrate 2 and the color filter substrate 1 facing each other, and a liquid crystal layer 42 sandwiched by the substrates 1 and 2 between which photo spacers 41 maintain a certain space.

The color filter substrate 1 in this case has a structure in which components are stacked on the transparent substrate 10 in the order of: the black matrix 20; the filter layer 30 having the color filters 31R, the color filters 31G, and the color filters 31B arranged therein; a counter electrode 43 formed of a transparent conductive film; the photo spacers 41; and a rubbed alignment film 44. The photo spacers 41 are arranged above the connecting portions 32R, the connecting portions 32G, and the connecting portions 32B.

Meanwhile, the TFT substrate 2 for example has, on a transparent substrate 12, an element formation layer 13 having formed therein wirings such as source lines, gate lines, and Cs lines (storage capacitor wirings), TFTs (switching elements), and an insulating layer. On the element formation layer 13, the TFT substrate 2 has pixel electrodes 4 formed of a transparent conductive film, and has an alignment film 5 which has been rubbed and covers the pixel electrodes 4.

The heights of the photo spacers 41 may be appropriately set according to a desired cell gap. Between the layers of the photo spacers 41 and the black matrix 20, color filters of at least one color, among the color filters 31R, the color filters 31G, and the color filters 31B, may be inserted. Further, the photo spacers 41 may be one that is produced by appropriately stacking some of the black matrix 20, the color filter 31R, the color filter 31G, and the color filter 31B; for example, each photo spacer 41 may be produced by providing an island portion to each of the color filter 31R, the color filter 31G, and the color filter 31B, and stacking the island portions on the black matrix 20 such that a columnar structure is formed. Alternatively, the photo spacers 41 may be formed on the TFT substrate 2.

After the spacers are formed, a transparent electrode (counter electrode) and an alignment film are formed in the stated order on the main face of the insulating layer 10 on which the black matrix 20, the color filters 31R, the color filters 31G, the color filters 31B, and the like are formed. Thereby, the color filter substrate 1 is completed. Examples of the transparent electrode include transparent conductive films such as an indium tin oxide film (ITO film). Examples of the method of forming a transparent electrode include sputtering. Examples of the material of the alignment film include heat curable polyimide resins.

The thus-produced color filter substrate 1 and a common TFT substrate are then sent to a cell assembly process and a module assembly process to complete the liquid crystal display device of the present embodiment. The alignment films of the color filter substrate 1 and the TFT substrate are rubbed in the cell assembly process. Also, in the case that spherical spacers such as beads are used as the spacer, the spherical spacers are first scattered over the color filter substrate 1 or the TFT substrate, and then the substrates are attached.

As described above, the concept of the liquid crystal display device of the present embodiment enables suppression of a switching domain and disclination in a liquid crystal display device provided with rubbed alignment films.

Further, each dot in the color filter substrate 1 is surrounded by the black matrix 20. For this reason, the number of steep elevation changes resulting from the black matrix 20 and steep elevation changes resulting from the forms of the end faces of the respective color filters 31R, color filters 31G, and color filters 31B increases in the color filter substrate 1. In other words, the color filter substrate 1 has a structure that can easily cause disclination. However, when adjacent dots are partially connected in the color filter substrate 1, the continuity of the alignment can be easily maintained and therefore disclination can be effectively suppressed. As described above, the present invention can provide a remarkable effect of suppressing disclination on a structure in which each dot is surrounded by the black matrix 20.

Similarly, a color filter substrate having a large ratio of a light-shielding width to the aperture width of a dot easily causes disclination. More specifically, disclination easily occurs when a ratio of the light-shielding width of the black matrix 20 to the width of the aperture width of a dot in at least one of the horizontal and vertical directions is 0.3 or more. The present invention can provide a remarkable effect of suppressing disclination on such a color filter substrate.

The color filters 31R, the color filters 31G, and the color filters 31B in the color filter substrate 1 have elevation changes resulting from the black matrix 20. Further, the black matrix 20 is a resinous BM which contains a resin, and is thus likely to increase the elevation changes. Accordingly, the color filter substrate 1 tends to increase steep elevation changes resulting from the black matrix 20 and steep elevation changes resulting from the forms of the end faces of the respective color filters 31R, color filters 31G, and color filters 31B. That is, the color filter substrate 1 has a structure that can easily cause disclination. Specifically, disclination easily occurs when the black matrix 20 has a thickness of 1 µm or more. The color filter substrate 1, however, can effectively suppress disclination even in that case. As described above, the present invention can provide a remarkable effect of suppressing disclination on a structure in which the color filters 31R, the color filters 31G, and the color filters 31B have elevation changes resulting from the black matrix 20, or a structure in which the black matrix 20 contains a resin.

The color filter substrate 1 does not include an overcoat layer (a film providing a flattering effect) for covering the color filters 31R, the color filters 31G, the color filters 31B, and the black matrix 20. Accordingly, the alignment film has elevation changes resulting from the color filters 31R, the color filters 31G, and the color filters 31B. For this reason, the alignment of liquid crystal molecules in the color filter substrate 1 is directly affected by the steep elevation changes resulting from the black matrix 20 and the steep elevation changes resulting from the forms of the end faces of the respective color filters 31R, color filters 31G, and color filters 31B. That is, the color filter substrate 1 has a structure that can easily cause disclination. However, when adjacent dots are partially connected in order to maintain the continuity of the alignment in the color filter substrate 1, disclination can be effectively suppressed. As above, the present invention can provide a remarkable effect of suppressing disclination when the concept of the present invention is applied to color filter substrates and liquid crystal display devices in which an overcoat layer for covering the color filters 31R, the color filters 31G, the color filters 31B, and the black matrix 20 is not formed.

According to the investigations made by the present inventors, a color filter substrate is more likely to cause disclination when having a photo spacer than when having a spacer other than a photo spacer, for example, spherical spacers such as beads. The color filter substrate 1, however, can effectively suppress disclination even when having the photo spacer 41 as the spacer, as illustrated in FIG. 11. In this way, the present invention can provide a remarkable effect of suppressing disclination when the concept of the present invention is applied to color filter substrates and liquid crystal display devices which have a photo spacer.

Variations of the present embodiment are described below.

Figure 3:
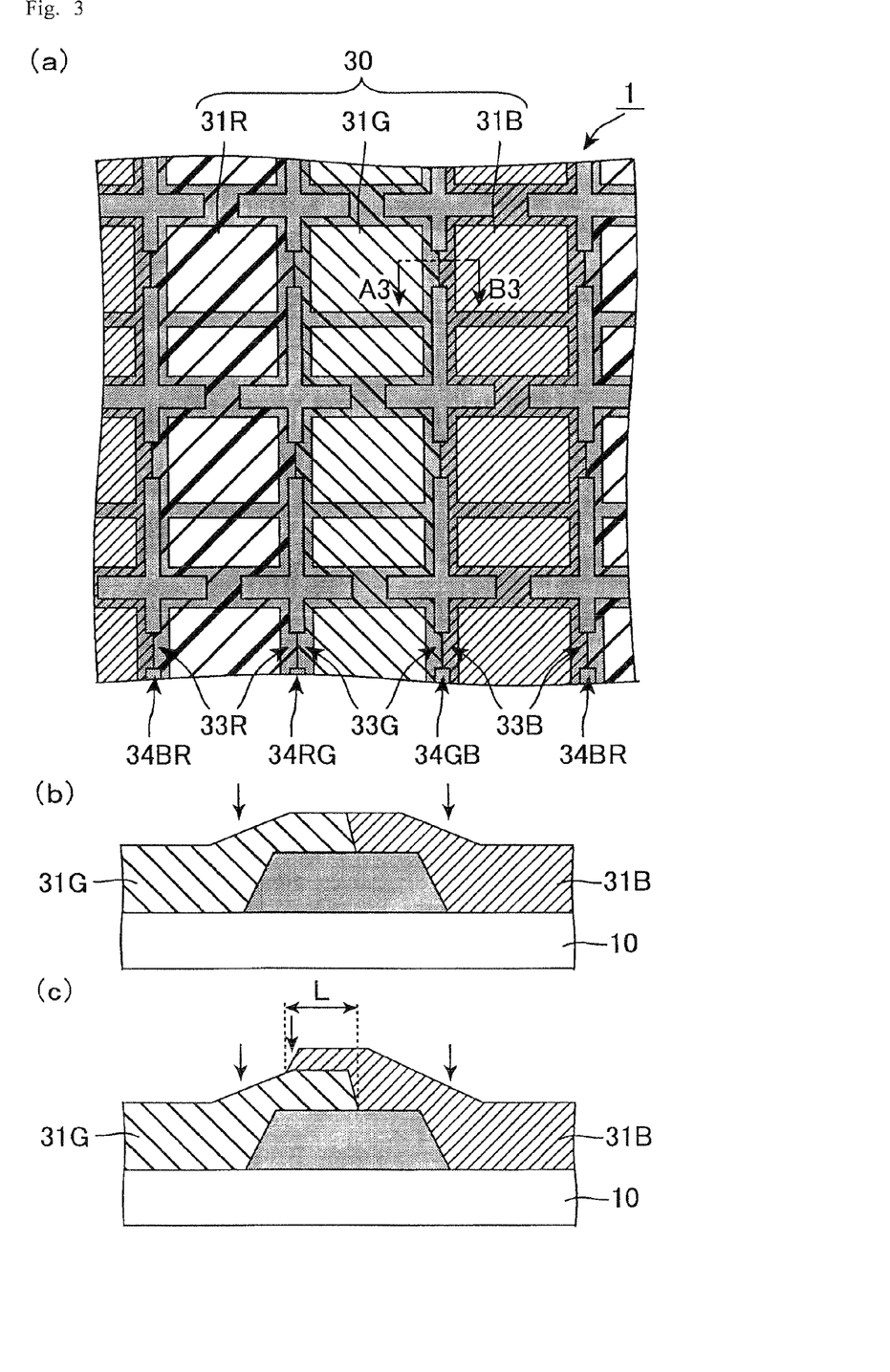
FIG. 3 are schematic views each illustrating a variation of the color filter substrate of Embodiment 1 according to the present invention.

FIG. 3 are schematic views each illustrating a variation of the color filter substrate of Embodiment 1 according to the present invention: FIG. 3(a) shows a plan view of the substrate; and FIGS. 3(b) and 3(c) each show a cross-sectional view taken along the A3-B3 line in FIG. 3(a). The color filter 31R, the color filter 31G, and the color filter 31B each may be partially in contact, on the black matrix 20, with an adjacent different-color filter, as illustrated in FIG. 3(a). More specifically, the color filter 31R, the color filter 31G, and the color filter 31B may respectively have, on adjacent different-color filter sides, projections 33R, projections 33G, and projections 33B which project at parts of the borders between adjacent dots. Those projections 33R, projections 33G, and projections 33B each may be in contact with adjacent different-color projections in the horizontal direction in FIG. 3(a). That is, the color filter substrate may have contact portions 34RG, contact portions 34GB, and contact portions 34BR at each of which adjacent different-color filters are partially in contact with each other. This, similarly to the above embodiment, makes it easier to maintain the continuity of liquid crystal molecule alignment between adjacent dots, and thus to suppress disclination. Also, a switching domain can be suppressed.

At this time, as illustrated in FIG. 3(b), the projections 33R, the projections 33G, and the projections 33B may not overlap each other but may be in contact with each other. Alternatively, the projections may overlap the adjacent different-color projections as illustrated in FIG. 3(c). The structure shown in FIG. 3 (b) can reduce the locations of steep elevation changes resulting from the black matrix 20 to only two (the two locations shown by the arrows in FIG. 3 (b)) in the vicinity of the contact portions 34RG, the contact portions 34GB, and the contact portions 34BR. This structure therefore enables easier maintenance of the continuity of liquid crystal molecule alignment between dots. Meanwhile, the structure shown in FIG. 3(c) can be easily produced even when an alignment disorder occurs in patterning of the color filters 31R, the color filters 31G, and the color filters 31B. Hence, this structure attains higher yield.

In the structure shown in FIG. 3(c), steep elevation changes resulting from the black matrix 20 occur at three locations (the three locations shown by arrows in FIG. 3(c)) in the vicinity of the contact portion 34RG, the contact portion 34GB, and the contact portion 34BR. However, the resist material has provided the flattering effect, and therefore the projections 33R, the projections 33G, and the projections 33B each have a smaller thickness in a region overlapping a projection of an adjacent different-color filter (the region indicated by "L" in FIG. 3(c)) than in other regions. Accordingly, this structure also can maintain the continuity of liquid crystal molecule alignment between adjacent dots, and can suppress disclination.

However, if the region (indicated by "L" in FIG. 3(c)) is very large in which the projection 33R, the projection 33G, or the projection 33B overlaps a projection of a different-color filter, the elevation change in the region will be very large even under the flattering effect of the resist material, and this may lead to failure in suppression of disclination. More specifically, the length L of the region in which the projection 33R, the projection 33G, or the projection 33B overlaps an adjacent projection of a different-color filter is preferably not more than 2 μm. A length of the overlapping region of more than 2 μm may not result in sufficient suppression of disclination.

Figure 4:
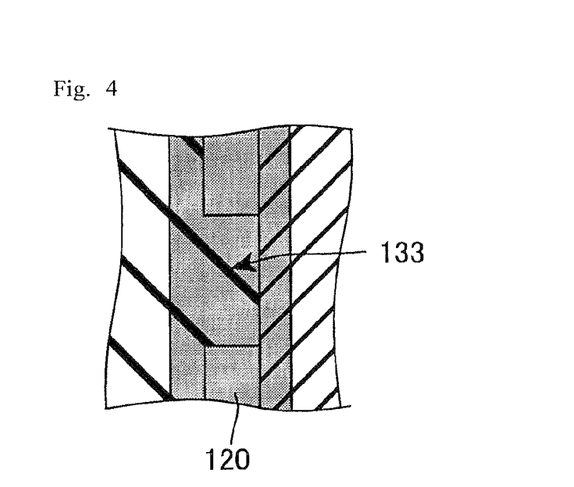
FIG. 4 is a schematic plan view illustrating the color filter substrate of Comparative Example.

FIG. 4 is a schematic plan view illustrating the color filter substrate of Comparative Example. As illustrated in FIG. 4, when only one of adjacent different-color filters has a projection 133 and the other of the adjacent different-color filters does not have a projection, the projection 133 will be located closer to the end of the black matrix 120, i.e., to the adjacent different-color dot opening. Accordingly, when an alignment disorder of a photomask is caused in patterning of the color filters 31R, the color filters 31G, and the color filters 31B, the projection 133 may be out of the predetermined position to reach the adjacent different-color dot opening, and the chromaticity may change. In view of this, the width of the black matrix 120 may be widened to prevent the projection 133 from reaching the different-color dot opening. In this case, the aperture ratio may be decreased. That is, it is difficult for this color filter substrate of Comparative Example to achieve a high aperture ratio while suppressing a chromaticity change.

In contrast, the color filter substrate 1 of the present variation has adjacent different-color filters projected toward each other to be in contact with each other as illustrated in FIG. 3. For this reason, the contact portions 34RG, the contact portions 34GB, and the contact portions 34BR each are located further from the end of the black matrix 120, i.e., from the adjacent different-color dot opening. Accordingly, compared to Comparative Example illustrated in FIG. 4, it is possible to further increase the area to avoid the contact portions 34RG, the contact portions 34GB, and the contact portions 34BR from being out of the black matrix 20, in the case that the alignment disorder is caused in an exposure process in patterning of the color filters 31R, the color filters 31G, and the color filters 31B. That is, there is little demand for the color filter substrate 1 of the present variation to have an especially increased width of the black matrix 20 in order to prevent the contact portions 34RG, the contact portions 34GB, and the contact portions 34BR from reaching the adjacent dot opening to change the chromaticity. Accordingly, the color filter substrate 1 of the present variation can effectively suppress a decrease in the aperture ratio while suppressing a chromaticity change.

Further, the projections 33R, the projections 33G, and the projections 33B of the respective color filters 31R, color filters 31G, and color filters 31B are in contact with the projections of all the adjacent different-color filters, as illustrated in FIG. 3(a). Hence, disclination can be more effectively suppressed.

Further, in the present variation, adjacent different-color filters are partially in contact with each other in the entire display region, and therefore disclination can be suppressed while a switching domain is reduced in the entire display region of the liquid crystal display device.

The projections 33R, the projections 33G, and the projections 33B each may have any planar shape, such as a substantial rectangle as illustrated in FIG. 3(a), a substantial triangle, a substantial semicircle, a substantial half-spindle, a substantial polygon, or the like.

FIG. 3 illustrate a structure in which the projections 33R, the projections 33G, and the projections 33B are respectively arranged at the centers of the borders separating the color filters 31R, the color filters 31G, and the color filters 31B (or dots). The arrangement places of the projections 33R, the projections 33G, and the projections 33B, i.e., the positions of the projections 33R, the projections 33G, and the projections 33B at the respective borders separating the color filters 31R, the color filters 31G, and the color filters 31B, may be appropriately set. The projections 33R, the projections 33G, and the projections 33B may be arranged in the corners of the borders of dots or at places near the corners.

Further, adjacent same-color filters may project toward each other so as to be in contact with each other. That is, adjacent same-color filters each may have a projection, and the same-color projections may be in contact with each other.

Figure 5:
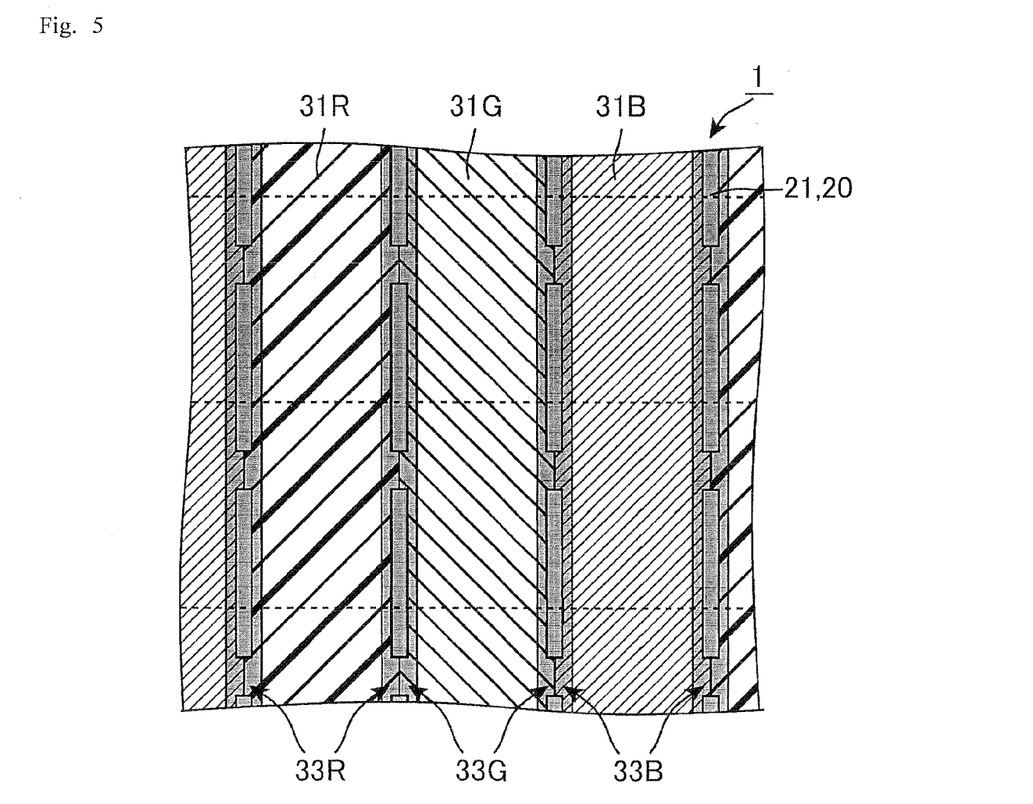
FIG. 5 is a schematic plan view illustrating another variation of the color filter substrate of Embodiment 1 according to the present invention.

FIG. 5 is a schematic plan view illustrating another variation of the color filter substrate of Embodiment 1 according to the present invention. The black matrix 20 may have only the portions (source light-shielding portions) 21 which are formed along the source lines of the TFT substrate (counter substrate) as illustrated in FIG. 5, and extend in the vertical direction in FIG. 5. The color filters 31R, the color filters 31G, and the color filters 31B may be continuously formed for dots adjacent to each other in the vertical direction in FIG. 5. This structure does not cause steep elevation changes between dots adjacent to each other in the vertical direction in FIG. 5. Accordingly, it is possible to decrease the proportion of the region having steep elevation changes therein compared to the structure in which each dot is surrounded by the black matrix 20. This leads to a lower rate of disclination occurrence.

Further, the color filter 31R, the color filter 31G, and the color filter 31B have the respective projections 33R, projections 33G, and projections 33B in contact with projections of different-color filters which are adjacent in the horizontal direction in FIG. 5. This structure enables reduction of the number of steep elevation changes that occur in the vicinity of the source light-shielding portions 21 of the black matrix 20. Accordingly, the present variation, despite an originally low rate of disclination occurrence, can even more effectively suppress disclination.

In the present variation, the gate lines of the TFT substrate shield from light the portions (the portions indicated by the dotted lines in FIG. 5) between dots which are adjacent to each other in the vertical direction in FIG. 5.

Figure 6:
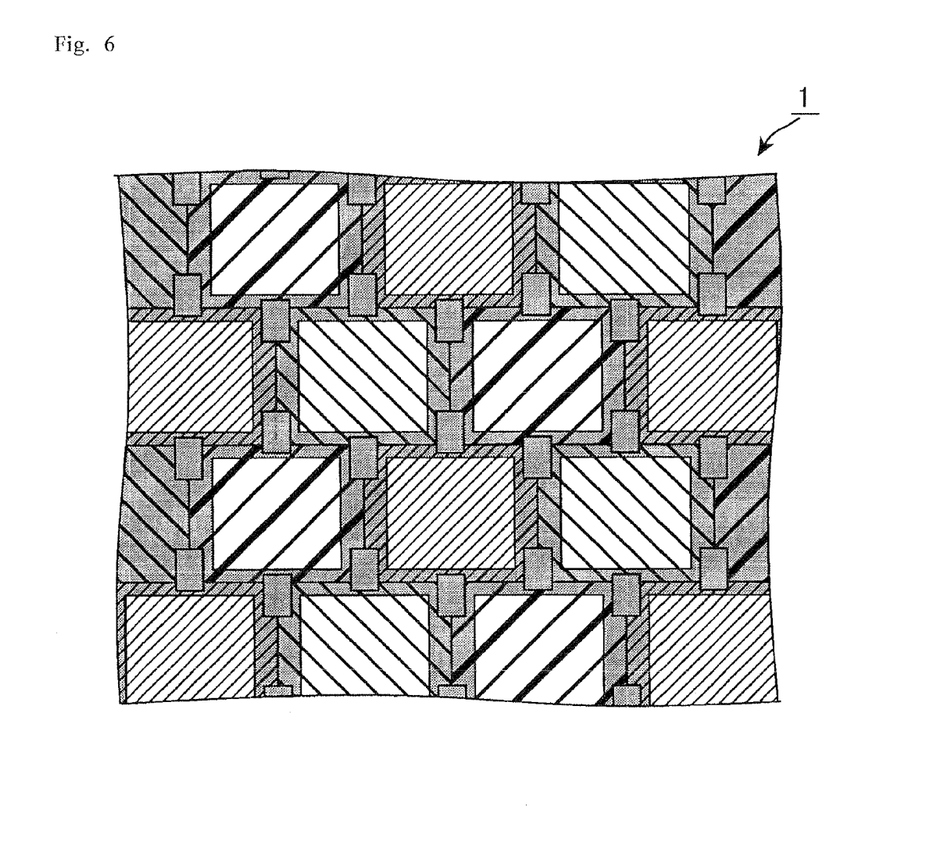
FIG. 6 is a schematic plan view illustrating yet another variation of the color filter substrate of Embodiment 1 according to the present invention.

FIG. 6 is a schematic plan view illustrating yet another variation of the color filter substrate of Embodiment 1 according to the present invention. The color filter substrates having any of the above structures each employ a stripe arrangement. The present invention may employ any dot arrangement, such as a delta arrangement illustrated in FIG. 6, a mosaic arrangement, a square arrangement, or the like.

Here, although FIG. 1 show only the structure in which same-color filters adjacent to each other in the vertical direction are connected, only different-color filters adjacent to each other in the horizontal direction in FIG. 1 may be in contact with each other. In this way, adjacent color filters may be connected or in contact with each other at any place, in the color filter substrate of the present invention. The color filters adjacent to each other only in a certain direction may be connected or in contact with each other as illustrated in FIG. 1. Alternatively, as illustrated in FIG. 3, all adjacent color filters may be connected or in contact with each other. Yet alternatively, randomly selected sets of adjacent color filters may be connected or in contact with each other.

The color filters 31R, the color filters 31G, and the color filters 31B are formed on the color filter substrate 1 in each of the above structures. The type or the number of colors for color filters (or dots) to be provided in the present invention is not particularly limited. For example, color filters of cyan, magenta, and yellow may be provided, or color filters of four or more colors, for example, red, green, blue, and yellow may be provided.

(Verification Test)

Figure 7:
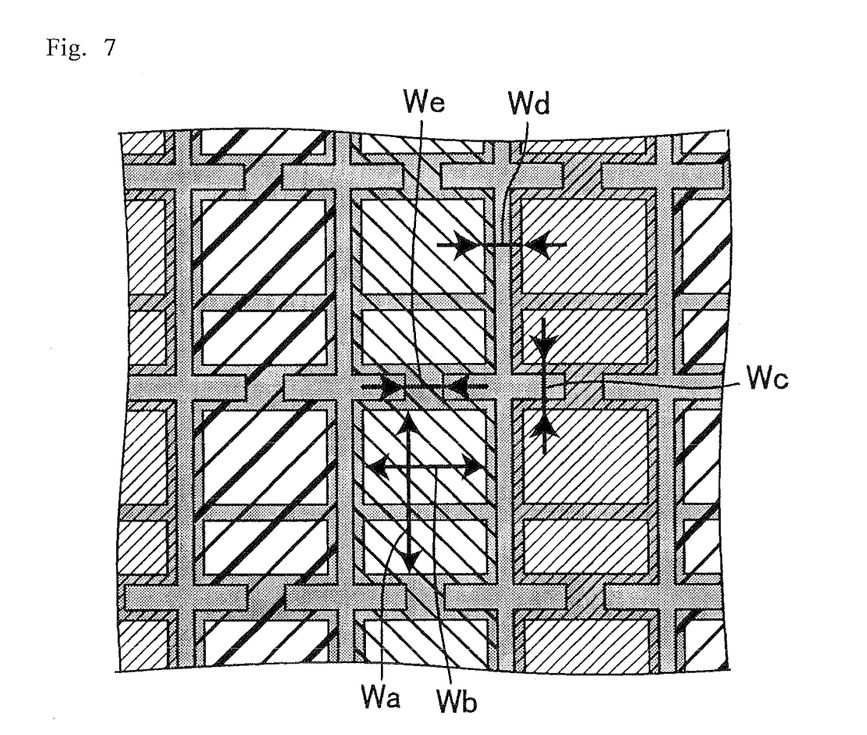
FIG. 7 is a schematic plan view illustrating the color filter substrate according to the present invention which was used for the verification test for the rate of disclination occurrence.

A TN liquid crystal display device actually produced with the color filter substrate according to the present invention was tested on the rate of disclination occurrence. FIG. 7 is a schematic plan view illustrating the color filter substrate according to the present invention which was used for the verification test for the rate of disclination occurrence.

Example 1

As illustrated in FIG. 7, a color filter substrate that is the same as the color filter substrate 1 illustrated in FIG. 1 was produced. Specifically, a black photosensitive resin composition was applied on a glass substrate and was patterned into the black matrix 20 having a thickness of 1.1 µm. On the black matrix 20, liquid color resists were applied and patterned into the respective color filters 31R, color filters 31G, and color filters 31B, in the stated order. The color filter 31R, the color filter 31G, and the color filter 31B each had a thickness of 1.9 µm in the dot openings, and had a thickness of from 1.0 to 1.4 µm on the black matrix 20. As a result, the color filter 31R, the color filter 31G, and the color filter 31B had elevation changes, resulting from the black matrix 20, of from 0.2 to 0.6 micrometers.

The dot pitch in the vertical direction (vertical pitch) in FIG. 7 was 159 µm. The dot pitch in the horizontal direction (horizontal pitch) in FIG. 7 was 53 µm. The width (vertical width of an opening) Wa of the dot openings in the vertical direction in FIG. 7 was 116 µm. The width (horizontal width of an opening) Wb of the dot openings in the horizontal direction in FIG. 7 was 45 µm. The width Wc of the gate light-shielding portions 22 of the black matrix 20 was 43 µm. The width Wd of the source light-shielding portions 21 of the black matrix 20 was 8 µm. The width We of the connecting portions 32R, the connecting portions 32G, and the connecting portions 32B in the horizontal direction in FIG. 7 was 15 µm. As can be seen from these, the ratio We/Wb here was not less than 0.3. The width We of connecting portions is, more specifically, the average length of connecting portions in the direction perpendicular to the arrangement direction of same-color dots that have the dot portions thereof connected at the connecting portions. The width Wb of dot openings is the average length of dot openings in the same direction as the width We of the connecting portions.

Next, an ITO film and an alignment film produced from a polyimide resin were formed in this order, and then the alignment film was rubbed. After that, liquid crystal display devices for the verification test were produced with use of spacer beads, in accordance with a common method of producing a TN liquid crystal display device.

Example 2

Liquid crystal display devices for the verification test were produced which had the same configuration as that of the liquid crystal display device of Example 1, except that the ratio We/Wb was changed to 0.38.

Comparative Example 1

Liquid crystal display devices for the verification test were produced which had the same configuration as that of the liquid crystal display device of Example 1 except that the connecting portions 32R, the connecting portions 32G, and the connecting portions 32B were not provided. That is, liquid crystal display devices having a ratio We/Wb of 0 were produced. In the color filter substrate used for the present comparative example, the dot pitch in the vertical direction (vertical pitch) was 171 μm, the dot pitch in the horizontal direction (horizontal pitch) was 57 μm, the width (vertical width of an opening) Wa of the dot openings in the vertical direction was 116.5 μm, the width (horizontal width of an opening) Wb of the dot openings in the horizontal direction was 49 μm, the width Wc of the gate light-shielding portions of the black matrix was 54.5 μm, and the width Wd of the source light-shielding portions of the black matrix was 8 μm.

Comparative Example 2

Liquid crystal display devices for the verification test were produced which had the same configuration as that of the liquid crystal display device of Example 1 except that dot portions for adjacent same-color dots were connected at all the borders between the same-color dots. That is, liquid crystal display devices were produced in which the width We of the connecting portions 32R, the connecting portions 32G, and the connecting portions 323 was the same as the width Wb of the dot openings (i.e., We/Wb=1). In the color filter substrate used for the present comparative example, the dot pitch in the vertical direction (vertical pitch) was 171 μm, the dot pitch in the horizontal direction (horizontal pitch) was 57 μm, the width (vertical width of an opening) Wa of the dot openings in the vertical direction was 116.5 μm, the width (horizontal width of an opening) Wb of the dot openings in the horizontal direction was 49 μm, the width Wc of the gate light-shielding portions of the black matrix was 54.5 μm, and the width Wd of the source light-shielding portions of the black matrix was 8 μm.

(Frequency of Disclination Occurrence)

As shown in the following Table 1, the liquid crystal display devices of Comparative Example 1 had a very high frequency of disclination occurrence of 18%, and the liquid crystal display devices of Comparative Example 2 had defects caused by a switching domain. In contrast, Example 1 did not have defects caused by a switching domain or disclination.

TABLE 1

|  | We/Wb | Frequency of disclination occurrence |
| --- | --- | --- |
| Comparative Example 1 | 0 | 18% |
| Example 1 | 0.33 | 0% |
| Example 2 | 0.38 | 0% |
| Comparative Example 2 | 1 | — |

The present application claims priority to Patent Application No. 2008-95135 filed in Japan on Apr. 1, 2008 under the Paris Convention and provisions of national law in a designated State, the entire contents of which are hereby incorporated by reference.

BRIEF DESCRIPTION OF DRAWINGS

FIG. 1(a) shows a plan view of the substrate; and FIG. 1(b) shows a cross-sectional view taken along the A1-B1 line in FIG. 1(a).

FIG. 2(a) shows a plan view of the substrate; and FIG. 2(b) shows a cross-sectional view taken along the A2-B2 line in FIG. 2(a).

FIG. 3(a) shows a plan view of the substrate; and FIGS. 3(b) and 3(c) each show a cross-sectional view taken along the A3-B3 line in FIG. 3(a).

FIG. 9(a) shows a plan view of the substrate; and FIG. 9(b) shows a cross-sectional view taken along the X-Y line in FIG. 9(a).

FIG. 11(a) shows a plan view of the substrate; FIG. 11(b) shows a cross-sectional view taken along the A4-B4 line in FIG. 11(a); and FIG. 11(c) shows a cross-sectional view taken along the A5-B5 line in FIG. 11(a).

EXPLANATION OF NUMERALS AND SYMBOLS

| 1, 101: | Color filter substrate |
| --- | --- |
| 2: | TFT substrate |
| 4: | Pixel electrode |
| 5: | Alignment film |
| 10, 12, 110: | Transparent substrate |
| 13: | Element formation layer |
| 20, 120: | Black matrix |
| 21: | Source light-shielding portion |
| 22: | Gate light-shielding portion |
| 23: | Cs light-shielding portion |
| 30, 130: | Filter layer |
| 31R, 131R: | Red (R) color filter |
| 31G, 131G: | Green (G) color filter |
| 31B, 131B: | Blue (B) color filter |
| 32R, 32G, 32B: | Connecting portion |
| 33R, 33G, 33B, 133: | Projection |
| 34RG, 34GB, 34BR: | Contact portion |
| 35: | Red photosensitive resin film (color film) |
| 41: | Photo spacer |
| 42: | Liquid crystal layer |
| 43: | Counter electrode |
| 44: | Alignment Film |
| 141a, 141b: | Rubbing direction |

The invention claimed is:
1. A color filter substrate comprising, on a substrate:
a plurality of dots;

a light-shielding member that shields a portion between the plurality of dots from light;

and a plurality of color filters that are arranged planarly and overlap at respective ends thereof the light-shielding member, wherein the plurality of color filters comprise a third color filter that comprises a plurality of dot portions for same-color dots adjacent to each other, and a connecting portion disposed on the light-shielding member, adjacent dot portions among the plurality of dot portions of the third color filter are partially connected at the connecting portion, and wherein said light-shielding member is in the shape of a grid, with each dot being provided within its own opening in the grid, and wherein the opening in the grid for each dot has a Cs shielding crossing member extending through a central portion of the opening for covering a Cs line on an active substrate, and wherein in the grid the Cs shielding crossing members are thinner than are gate line shielding crossing members that extend in the same direction as the Cs shielding crossing members.

2. The color filter substrate according to claim 1, wherein a ratio We/Wb of a width We of the connecting portion and an aperture width Wb of the dot is 0.3 or more.

3. The color filter substrate according to claim 1, wherein each of the dots is surrounded by the light-shielding member.

4. The color filter substrate according to claim 1, wherein the plurality of color filters each have a cross section of a forward tapered shape.

5. The color filter substrate according to claim 1, wherein each of the plurality of color filters has a smaller thickness on the light-shielding member than in a dot opening.

6. The color filter substrate according to claim 1, wherein the plurality of color filters each are formed of a liquid resist or a film resist.

7. The color filter substrate according to claim 1, wherein the plurality of color filters each have an elevation change resulting from the light-shielding member.

8. The color filter substrate according to claim 1, wherein the light-shielding member contains a resin.

9. The color filter substrate according to claim 1, wherein the color filter substrate does not include any overcoat layer for covering the light-shielding member and the plurality of color filters.

10. A liquid crystal display device comprising the color filter substrate according to claim 1, a substrate facing the color filter substrate, and a liquid crystal layer sandwiched between the substrates.

11. The liquid crystal display device according to claim 10, wherein the color filter substrate has a rubbed alignment film on a surface thereof on the liquid crystal layer side.

12. The liquid crystal display device according to claim 10, wherein the alignment film has an elevation change resulting from the plurality of color filters.

13. The liquid crystal display device according to claim 10, wherein the color filter substrate has a columnar spacer on the liquid crystal layer side.

14. The color filter substrate according to claim 1, wherein the light-shielding member includes a first portion where the light-shielding member is covered with the connecting portion of the third color filter and a second portion where the light-shielding member partitions the plurality of dot portions of the third color filter.

* * * * *